US006577333B2

(12) United States Patent
Tai et al.

(10) Patent No.: US 6,577,333 B2
(45) Date of Patent: Jun. 10, 2003

(54) AUTOMATIC MULTI-CAMERA VIDEO COMPOSITION

(75) Inventors: Li-Cheng Tai, San Diego, CA (US); Boon-Lock Yeo, Sunnyvale, CA (US); Minerva Ming-Yee Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 09/735,716

(22) Filed: Dec. 12, 2000

(65) Prior Publication Data

US 2002/0105598 A1 Aug. 8, 2002

(51) Int. Cl.$^7$ ................................................. H04N 7/14
(52) U.S. Cl. ............................. 348/14.08; 348/14.09; 348/14.01
(58) Field of Search .................. 348/14.01–14.09, 348/14.1, 14.11–14.13, 14.16; 370/260, 261; 709/204; 345/753; 704/233, 270, 246; H04N 7/14, 7/15

(56) References Cited

U.S. PATENT DOCUMENTS

| 5,686,957 A | | 11/1997 | Baker | |
| 5,844,599 A | | 12/1998 | Hildin | |
| 6,346,963 B1 | * | 2/2002 | Katsuni | ................... 348/14.09 |

FOREIGN PATENT DOCUMENTS

| EP | 0523617 A2 | | 1/1993 | |
| JP | 363003589 A | * | 1/1988 | ............ H04N/7/14 |
| JP | 07-015711 | | 1/1995 | |
| JP | 408130723 A | * | 5/1996 | ............ H04N/7/15 |
| JP | 408163526 A | * | 6/1996 | ............ H04N/7/15 |
| WO | WO9607177 | | 3/1996 | |
| WO | WO9960788 | | 11/1999 | |

OTHER PUBLICATIONS

Canavesio, Franco and Castagneri, Giuseppe; *Strategies for Automated Camera Switching Versus Behavioural Patterns in Videoconferencing; IEEE*; 1984; pp. 313–318.

Goodridge, Steven George; *Multimedia Sensor Fusion for Intelligent Camera Control and Human–Computer Interaction*; Printed from NCSU website located at http://www.ie.ncsu.edu/kay/msf; printed on Oct. 9, 2000; pp. 1–5, p. 1 (abstract), pp. (introduction), p. 1 (fig. 3), p. 1 (fig. 4), pp. 1–14 (related work), pp. 1–10 (sound localization), pp. 1–7 (primitve vision), pp. 1–8 (audio–visual sensor fusion for face detection) pp. 1–7 (target tracking), pp. 1–7 (behavior fusion), pp. 1–5 (generic camera behaviors), pp. 1–5 (applications), p. 1 (fig. 74), pp. 1–5 (conclusions), pp. 1–9 (references), p. 1 (references).

Kelly, Patrick H.; *An Architecture for Multiple Perspective Interactive Video*; Printed from website located at http://www.acm.org/pubs/articles/proceedings/multimedia/217279/p201–kelly.htm; printed on Oct. 9, 2000; pp. 1–16.

* cited by examiner

*Primary Examiner*—Melur Ramakrishnaiah
(74) *Attorney, Agent, or Firm*—Marger Johnson & McCollom

(57) ABSTRACT

Methods and apparatus are disclosed for automatically selecting a video output from among several video input sources. In one method, one or more audio sensors are associated with each video input source. Preferably, an audio sensor is positioned to receive audio signals from directions that receive favorable coverage in the field of view of the associated video source. An autoselector calculates audio scores for each of the audio sensors over short (e.g., 0.5 seconds) examination intervals. At each examination interval, the potential exists for a different video source to be selected as the video output. The autoselector selects a video source based on the audio scores for an examination interval, as well as the recent time-history of video source selection. For instance, if a new video source has just been selected, selection of a different source may be disabled for a few seconds. The time-history is also used to increase the probability that source selection varies in a seemingly-natural manner.

24 Claims, 5 Drawing Sheets

AUTOMATIC MULTI-CAMERA VIDEO COMPOSITION

FIELD OF THE INVENTION

This present invention relates generally to multi-camera video systems, and more particularly to an automatic multi-camera video composition system and method for its operation.

BACKGROUND OF THE INVENTION

In the general field of video transmission and recording, it is common to concurrently capture video from multiple viewpoints or locations. One common example is sports broadcasting: a baseball game, for example, may use five or more cameras to capture the action from multiple viewing angles. One or more technicians switch between the cameras to provide a television signal that consists, hopefully, of the best view of whatever is happening in the game at that moment. Another example is a movie. Movie editing, however, takes place long after the events are recorded, with most scenes using a variety of camera shots in a selected composition sequence.

Although perhaps less exciting than a sports contest or a movie, many other applications of multi-camera video data exist. For instance, a selection of camera angles can provide a much richer record of almost any taped or broadcast event, whether that event is a meeting, a presentation, a videoconference, or an electronic classroom, to mention a few examples.

One pair of researchers has proposed an automated camera switching strategy for a videoconferencing application, based on speaker behavioural patterns. See F. Canavesio & G. Castagneri, "Strategies for Automated Camera Switching Versus Behavioural Patterns in Videoconferencing", in *Proc. IEEE Global Telecommunications Conf.*, pp. 313–18, Nov. 26–29 1984. The system described in this paper has one microphone and one camera for each of six videoconference participants. Two additional cameras provide input for a split-screen overview that shows all participants. A microprocessor periodically performs an "activity talker identification process" that detects who among all of the participants is talking and creates a binary activity pattern consisting of six "talk/no talk" values.

A number of time-based thresholds are entered into the system. The microprocessor implements a voice-switching algorithm that decides which of the seven camera views (six individual plus one overview) will be used for each binary activity pattern. In essence, the algorithm decides which camera view to use for a new evaluation interval based on who is speaking, which camera is currently selected, and whether the currently-selected camera view has been held for a minimum amount of time. If more than one simultaneous speaker is detected or no one speaks, the system will switch to the conference overview after a preset amount of time. And generally, when one speaker is detected, the system will continuously select the close-up view of that speaker as long as they continue to talk or take only short pauses.

BRIEF DESCRIPTION OF THE DRAWING

The invention may be best understood by reading the disclosure with reference to the drawing, wherein.

DETAILED DESCRIPTION OF THE EMBODIMENTS

Figure 1:
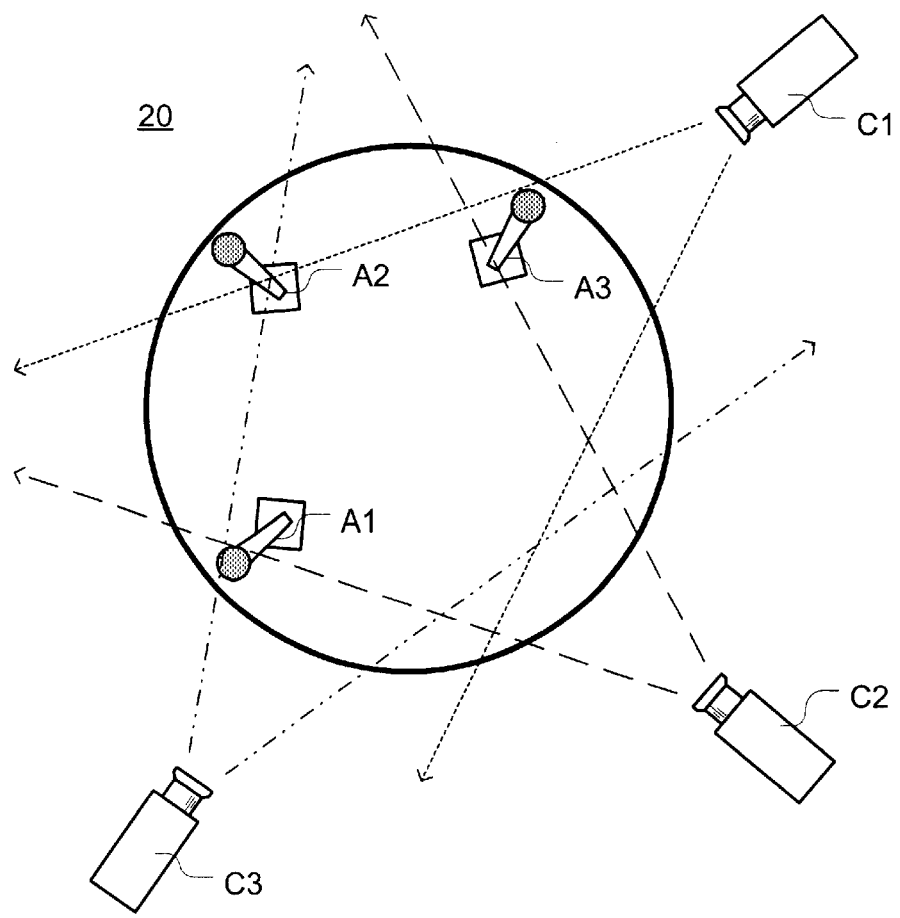
FIG. 1 illustrates a typical camera/microphone configuration for one embodiment of the invention.

The present disclosure includes systems and methods for autoselecting one of several concurrent video inputs as a video output. Generally, neither specific knowledge about camera positioning nor access to information from the video streams themselves is required to make the switching decision. Instead, the described embodiments can select a video output using audio inputs and video output selection history. This approach can greatly relax system calibration and processing power requirements, while providing a seemingly natural variety of video input selection. Optionally, information gleaned from the video streams can be used to further enhance the video input selection criteria.

It is observed herein that in many video scenarios (particularly conversational scenarios), the "best" of several available camera angles is that angle which most directly correlates with the position of an active human speaker (or other sound source). The described embodiments can take advantage of this observation, selecting a video source based on the location of audio activity. The described embodiments use an association matrix that relates each of multiple audio inputs to at least one video input. As a particular audio input shows an increase in audio activity, it becomes more probable that the video input(s) associated with that audio input will be selected as the current video output.

While the disclosed embodiments base video output selection in part on audio activity, other factors preferably enter into the selection process. Prominent among these other factors is a time history of video source selection. For instance, one person may dominate the dialogue captured on a composite video for an extended period of time. Although over this extended interval one camera angle may be "best" generally, the "best" composite video stream may from time to time show, e.g., a wider-angle view, the speaker from a somewhat-less-than-optimum perspective, or views of silent participants. By using time-history, the disclosed embodiments can select a mix of camera angles even while allowing one "best" audio channel to dominate. Or as another example, time-history can be used to enforce smoothness criteria, e.g., by providing that each time a new camera angle is selected, that angle will received an increased probability of remaining selected for some initial period of time.

The described embodiments provide several features not found in the system of Canavesio and Castagneri. For instance, with the present system, audio scoring is not limited to a binary process and camera/microphone association is flexible, allowing multiple microphones to associate with one camera and vice-versa. This introduces an aspect of randomness into the timing of video switches and introduces a variety of possible switching conditions (based on a given voice activity pattern) that are absent from the prior art. In the present system, other information can also be merged with audio scoring. This information may include gestures (head-nodding or -shaking) detected in video, motion detection, etc. And in at least one embodiment, the video feeds can originate at different remote locations, with each location potentially receiving a different view of the video session than the other locations.

Perhaps even more significant, the described embodiments can provide strong disincentives to continued selection of one camera for long periods of time, even if that camera presents a close-up view of a long-winded speaker. This adds visual interest to the video output, by interspersing short views of other participants and/or overviews even when one person is monopolizing the conversation.

To further illustrate these principles, a first embodiment is described with reference to the conference room configuration 20 of FIG. 1. In configuration 20, three microphones A1, A2, A3 are positioned around a conference table. Three video cameras C1, C2, C3 are arranged around the conference table as well. The field of view of camera C1 includes microphone A1, the field of view of camera C2 includes microphone A2, and the field of view of camera C3 includes microphone A3.

Figure 2:
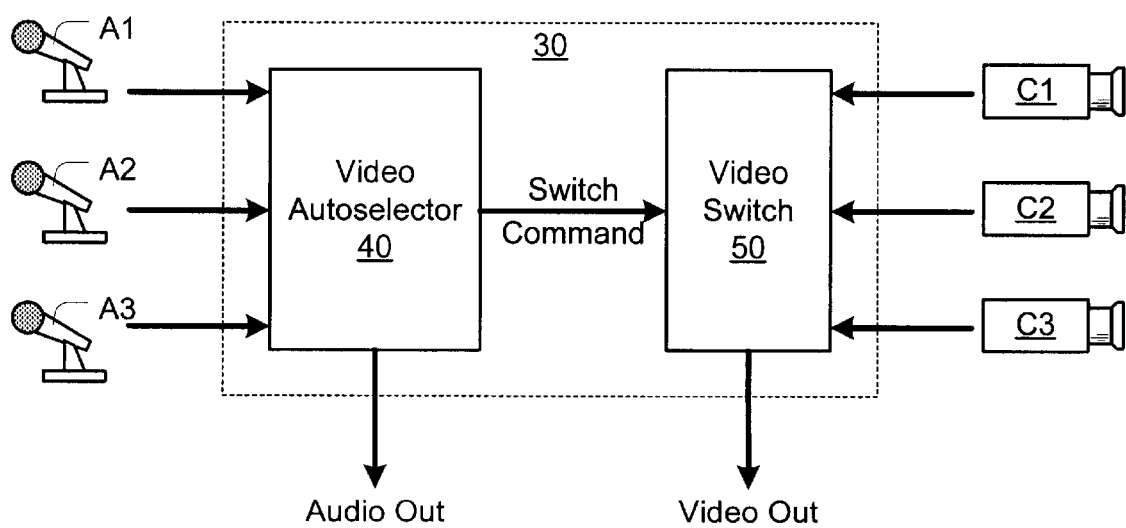
FIG. 2 shows a high-level block diagram for an automatic multi-camera video composition system according to an embodiment of the invention.

FIG. 2 shows the configuration of a video switching system 30 for use with a microphone/camera configuration such as configuration 20 of FIG. 1. A video autoselector 40 receives an audio input from each microphone A1, A2, and A3. A video switch 50 receives a video input from each camera C1, C2, C3. Video autoselector 40 produces an audio output and a switch command. Video switch 50 uses the switch command to switch video from one of video sources C1, C2, C3 to a video output.

Figure 3:
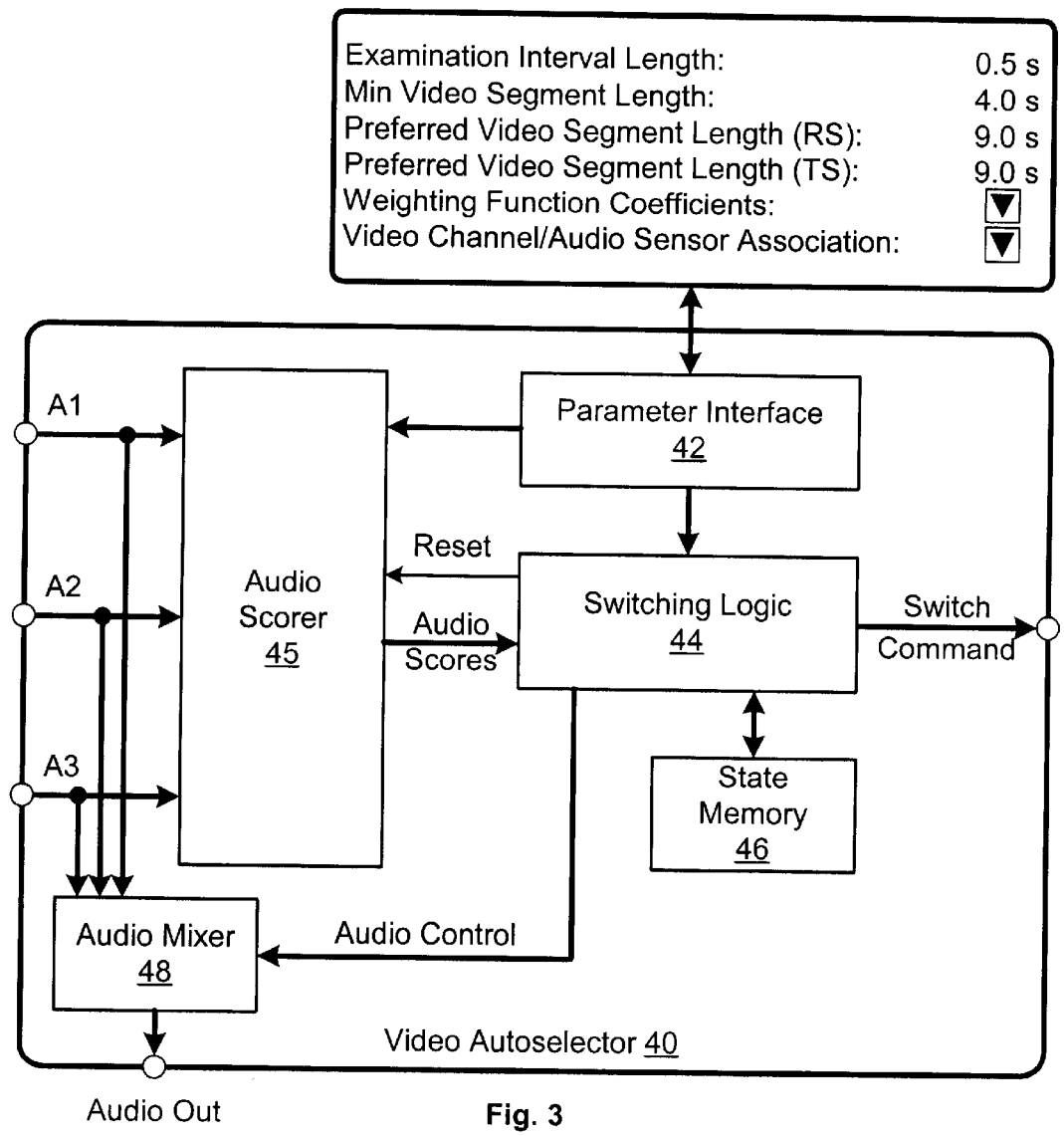
FIG. 3 contains a block diagram for a video autoselector according to an embodiment of the invention.

FIG. 3 contains a more detailed block diagram of video autoselector 40. Each of the blocks of FIG. 3 will be described in turn.

Parameter interface 42 provides operational parameters to switching logic 44. Preferably, at least some of these parameters can be adjusted by a user, either individually or in groups according to preset modes. The meaning of each parameter is discussed below in conjunction with a discussion of its usage.

An audio scorer 45 accepts audio inputs A1, A2, and A3. The examination interval length input parameter (from parameter interface 42) determines the length of time over which an audio score will be calculated. Switching logic 44 supplies a reset signal to scorer 45 when a new examination interval is to begin. The audio scorer forms an audio score, for each audio input A1, A2, A3, that expresses the level of audio activity present at that audio input during the examination interval. At the end of the interval, the audio scores are transmitted to switching logic 44.

Switching logic 44 makes the actual decision as to which of the video sources will be selected as the current video source for a given examination interval. This decision is based, in part, on the audio scores for that examination interval. The decision is also based on variables stored in state memory 46, as interpreted using parameters supplied by parameter interface 42.

State memory 46 stores at least a partial time history of video source selection. In one simple case, this history consists of the last-selected video source and an associated video segment length (representing the length of time that the last-selected video source has remained selected). The history may also classify the video segment according to a type. Other items may also be helpful in the history, such as the length of time since each non-selected video source was last selected and/or a history of the last n video segments.

Optionally, video autoselector 40 can include an audio mixer 48. Switching logic 44 can provide an audio control to mixer 48 to correspond with the current video selection. Or, mixer 48 can be fixed, e.g., to mix all audio inputs equally to form an audio output.

One method of operation of video autoselector 40 is as follows. The system considers the video channels and audio sensors specified in the video channel/audio sensor association parameter(s). This association may be manual (set by the user), fixed (e.g., a directional microphone is attached to each video camera), or automatically set based on physical configuration information (e.g., known microphone locations and camera field of views). The association may be 1:1, i.e., one audio input for each video input; in other embodiments, one audio input may map to multiple video inputs, or vice-versa. In the first example of FIGS. 1, 2, and 3, A1 maps to C1, A2 maps to C2, and A3 maps to C3. The mapping can be expressed as an N×M matrix, where N is the number of audio inputs and M is the number of video inputs. When the mapping is 1:1 (i.e., N=M), two length-N arrays can be used: A[i] represents an audio input, and V[i] represents the corresponding video input.

Figure 5:
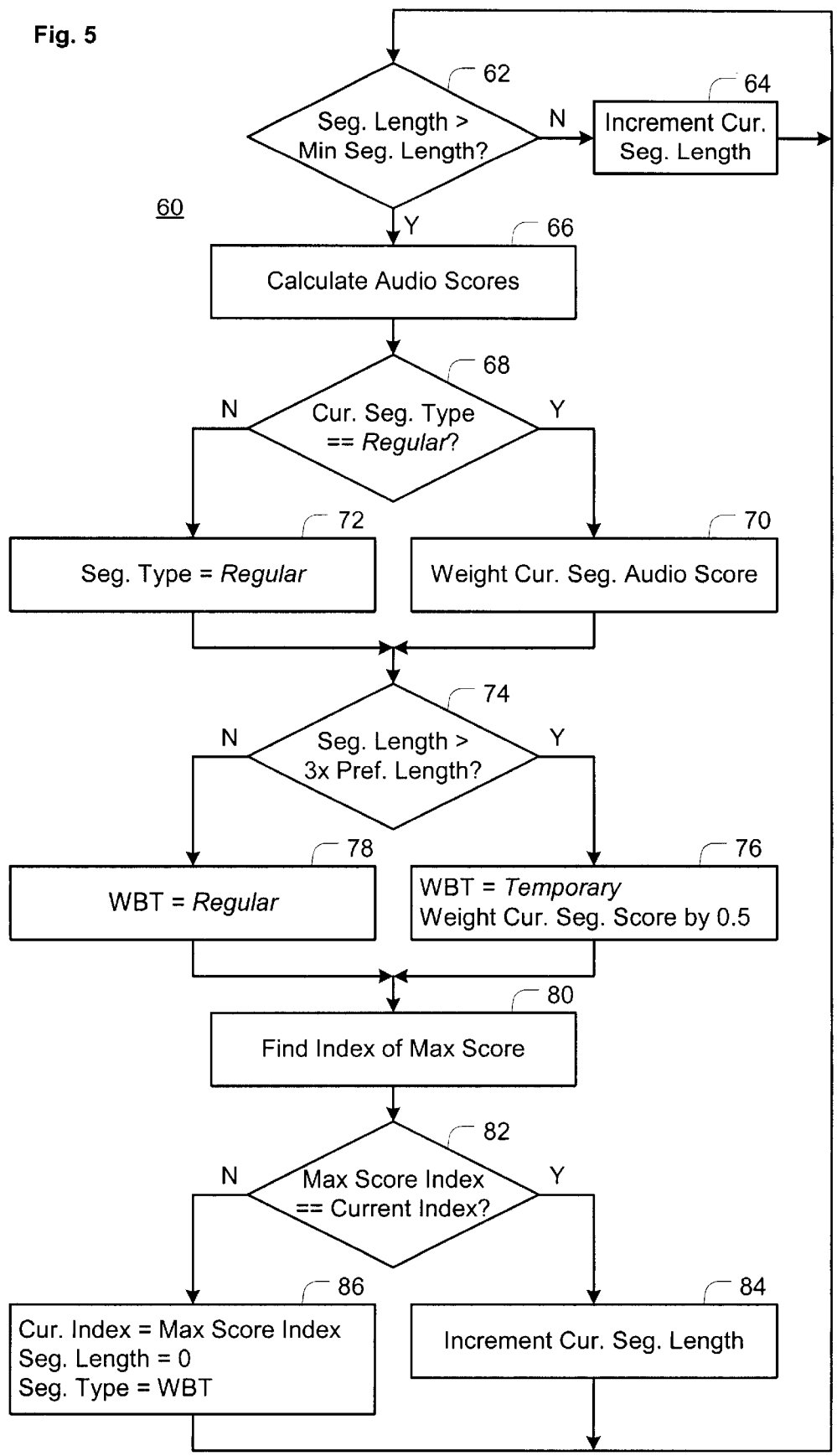
FIG. 5 contains a flowchart for video source autoselection according to one embodiment of the invention.

FIG. 5 contains a flowchart 60 comprising the iterative steps of one video source selection process. The system uses the time-history of video source selection in several ways. The first of these can take place at the beginning of each source selection iteration, at decision block 62. Whenever the system switches to a different video source, the system can be constrained to stay with that video source for at least the minimum video segment length (e.g., four seconds in the illustrated example). During this initial interval, the system may do nothing more than count time until the Min Video Segment Length is reached, looping repeatedly through blocks 62 and 64.

When the segment length finally reaches the minimum segment length, block 62 drops through to block 66. At block 66, an audio examination interval begins. The examination interval can relate to the video switching point in one of several ways, depending on the system mode. At least two modes are possible, real-time composition mode and posterior (e.g., archival) composition mode. In real-time composition mode, video switching uses an audio examination interval consisting of prior audio samples. For instance, if $t_s$ is a potential switching point, and the length of an examination interval is $T_E$, the examination interval for switching point $t_s$ would begin at $t_s-T_E$. Posterior composition mode, because it has no real-time constraint, can "look ahead" in the audio samples to see who will be speaking in the near future, and possibly switch video sources such that the new speaker is in view at the time that speaker begins to talk. For instance, in posterior composition mode the examination interval for video switching point $t_s$ could begin at $t_s-T_E/5$, and continue until $t_s+4T_E/5$, thus giving some weight to who is speaking just before the switching point and the bulk of the weight to who will be speaking just after the switching point.

Audio scorer 45 resets an audio score for each audio input at the beginning of an examination interval. Considering a digital implementation where each audio input is a pulse-code modulated sample stream, samples are considered in groups. For instance, with an audio stream sampled at 8 kHz, samples can be considered in groups of 50 consecutive samples (e.g., 6.25 msec temporal subwindows).

For each temporal subwindow and audio input, the maximum and minimum sample values are determined. The difference between these two sample values is calculated, representing (approximately) the maximum peak-to-peak amplitude of the audio input for that subwindow.

At the end of a subwindow, the difference calculated for an audio input is compared to the difference calculated for each other audio input for that subwindow. The input having the highest calculated difference "wins" the subwindow, and has its audio score incremented by one. One alternative to this winner-take-all subwindow scoring method is to normalize all calculated differences by the score with the highest calculated difference, and then increment each score by its normalized difference.

The process continues for each subwindow in the examination interval. At the end of the examination interval, each audio score will represent the number of subwindows where the corresponding audio input had the highest maximum calculated difference.

In this embodiment, the current video segment can be classified as one of two types, a regular video segment and a temporary video segment. A regular video segment is one that is selected as a result of a weighted comparison of audio scores (to be discussed shortly). A temporary video segment is one that is selected because the preceding regular segment has reached a length where additional measures are taken to increase the probability that a switch to a different camera view will occur.

Block 68 switches based on the current segment type. When the segment type is temporary, scoring bypasses the weighting function and proceeds to block 72. But block 72 sets the segment type of a temporary segment to regular because if the segment continues past this iteration, this indicates that the segment was selected in a head-to-head unweighted comparison of scores.

When the current video segment is already a regular segment, the audio score for that segment is weighted at block 70. The weight assigned to the audio score is a function of that segment's length.

Figure 4:
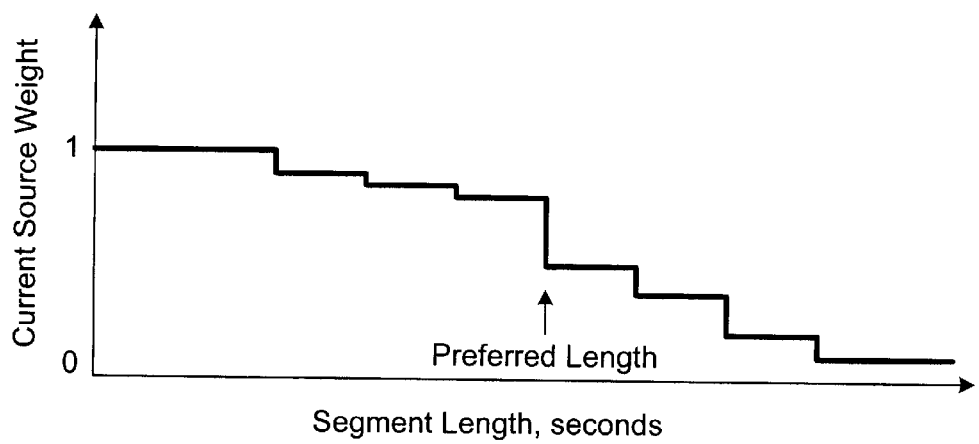
FIG. 4 contains a plot for an audio-score-weighting step function useful with an embodiment of the invention.

FIG. 4 illustrates one possible weighting function. At the beginning of a new segment, the source is weighted equally with all other sources. As the segment length continues to increase, however, the current source weight decreases in steps, thus increasing the probability that some other source will be selected instead.

Although a smooth weighting function can be used, the stepwise function of FIG. 4 allows the weight to be determined from a lookup operation based on segment length. An integer index n is computed, where $T_L$ is the current segment length, $T_P$ is the preferred video segment length, and C is a constant that adjusts the x scale of FIG. 4 (and thus how fast the decay function proceeds):

$$n = \min(\lfloor C^*T_L/T_P \rfloor, 8).$$

The index n is used to select a weight from an array W indexed from 0 to 8, where $$W = \{1.0, 1.0, 0.9, 0.85, 0.8, 0.5, 0.375, 0.2, 0.1\}.$$

In one example configuration including the W values above, $T_P=9$ and $C=5$. The weight assigned to the current segment decreases slowly until the segment reaches the preferred segment length (nine seconds), stepping through array elements 0 through 4 as the segment grows in duration. As a segment reaches a length of nine seconds, its associated audio score will receive a weight $W[5]=0.5$, which greatly increases the probability that another source will be selected when no other source was selected in the first nine seconds.

Block 74 can further increase the probability that another source will be selected when the current source has continued for an extended time period. At block 74, the current segment length is compared to a multiple of the preferred segment length (here set to 3.0). In this example, once the segment length exceeds the preferred length by a factor of three, the branch through block 76 is taken. At block 76, the score for the current source is penalized by an additional weight of 0.5. Also, the "would-be type" (WBT) is set to temporary. The would-be type is the segment type that will be assigned to a new segment if one is chosen during this iteration. Thus WBT=temporary indicates that a new source was selected after the current segment reached an extended length that triggered an incentive for some other source to intervene. Note that if the branch through block 76 is not taken, the branch through block 78 sets WBT=regular to indicate that any new source was selected without the aid of the block 76 penalty.

Block 80 compares the weighted audio scores for the current examination interval.

For example, with the weighted scores stored in an indexed array v[i], block 80 determines the index i of the maximum score. Block 82 then compares the index of the maximum score to the index of the current video source. If the indices are equal, the last-selected source has been selected again, and the current segment continues. In this case, block 84 increments the current segment length.

When the index of the maximum score does not match the index of the current video source, a new segment with a new source begins. Block 86 sets the current index to the index of the maximum score, resets the segment length to zero, and set the segment type equal to the would-be-type. Blocks 84 and 86 both loop back to block 62 to begin the next iteration.

Figure 6:
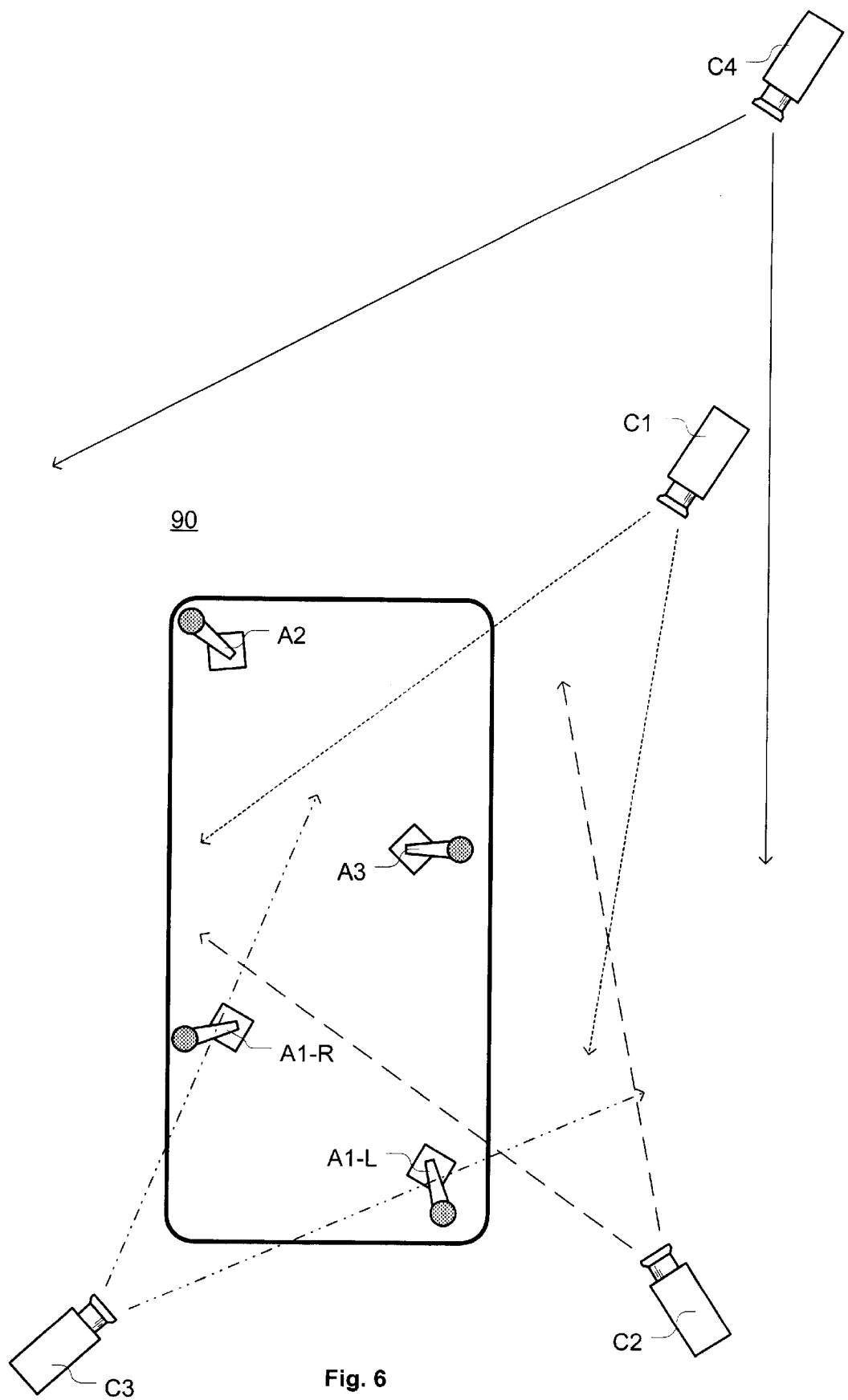
FIG. 6 illustrates a camera/microphone configuration for an embodiment of the invention.

Many other configurations of audio and video sources can be handled with an embodiment of the invention. For instance, FIG. 6 shows a configuration 90 using three primary cameras (C1, C2, and C3) and four microphones. Camera C1 is associated with two microphones A1-L and A1-R, both within the field of view of camera C1. This association can be handled in several ways.

One method to associate multiple audio inputs with one video source is to consider each audio source separately and take the highest of the sources as the raw score for the corresponding video source. This corresponds to taking the infinity-norm of the vector of audio sources corresponding to a video source. Other norms may also be used, such as the 1-norm (average the two scores together) or the 2-norm (root-mean-square value of the two scores).

Another method of associating multiple cameras with multiple audio inputs is to specify an association matrix. This not only allows multiple audio sensors to associate with a video source, but also allows multiple video sources to associate with an audio source. For instance, in FIG. 6 a fourth camera C4 is also shown. Camera C4 shows a wide-angle view of the entire conference table. One possible association matrix could be as follows:

| Video Source | Audio Sensor | | | |
|---|---|---|---|---|
| | A1-L | A1-R | A2 | A3 |
| C1 | 1.0 | 1.0 | 0.0 | 0.0 |
| C2 | 0.0 | 0.0 | 1.0 | 0.1 |

-continued

| Video Source | Audio Sensor | | | |
|---|---|---|---|---|
| | A1-L | A1-R | A2 | A3 |
| C3 | 0.0 | 0.0 | 0.0 | 1.0 |
| C4 | 0.2 | 0.2 | 0.1 | 0.1 |

With this matrix, the wide-angle view of camera C4 receives a portion of the score for each audio input, such that it is probable that the system will select the wide-angle view occasionally as one person speaks for an extended period. Also shown is a small weighting for audio sensor A3 and camera C2. Camera C2 shows a near-profile view of the area around audio sensor A3, allowing this to be an alternate view to be occasionally selected when a speaker near A3 speaks for an extended period.

Other embodiments can utilize information gleaned from video streams to supplement the video-switching process. For instance, known video processing algorithms such as frame-to-frame motion detection, face detection, etc., can be applied to one or more of the video streams. The results of these algorithms can affect scoring, or be incorporated into additional rules, in order to increase the probability of a switch to a video source that may be conveying silent information such as facial or hand gestures.

Although the preceding embodiments show a single-conference room multi-camera configuration, video autoselection according to embodiments of the invention is not limited to this application. For instance, FIG. 7 shows an embodiment 92 that operates across a communications network 96 (e.g., a circuit-switched network, a packet-switched network, or some combination of the two).

Figure 7:
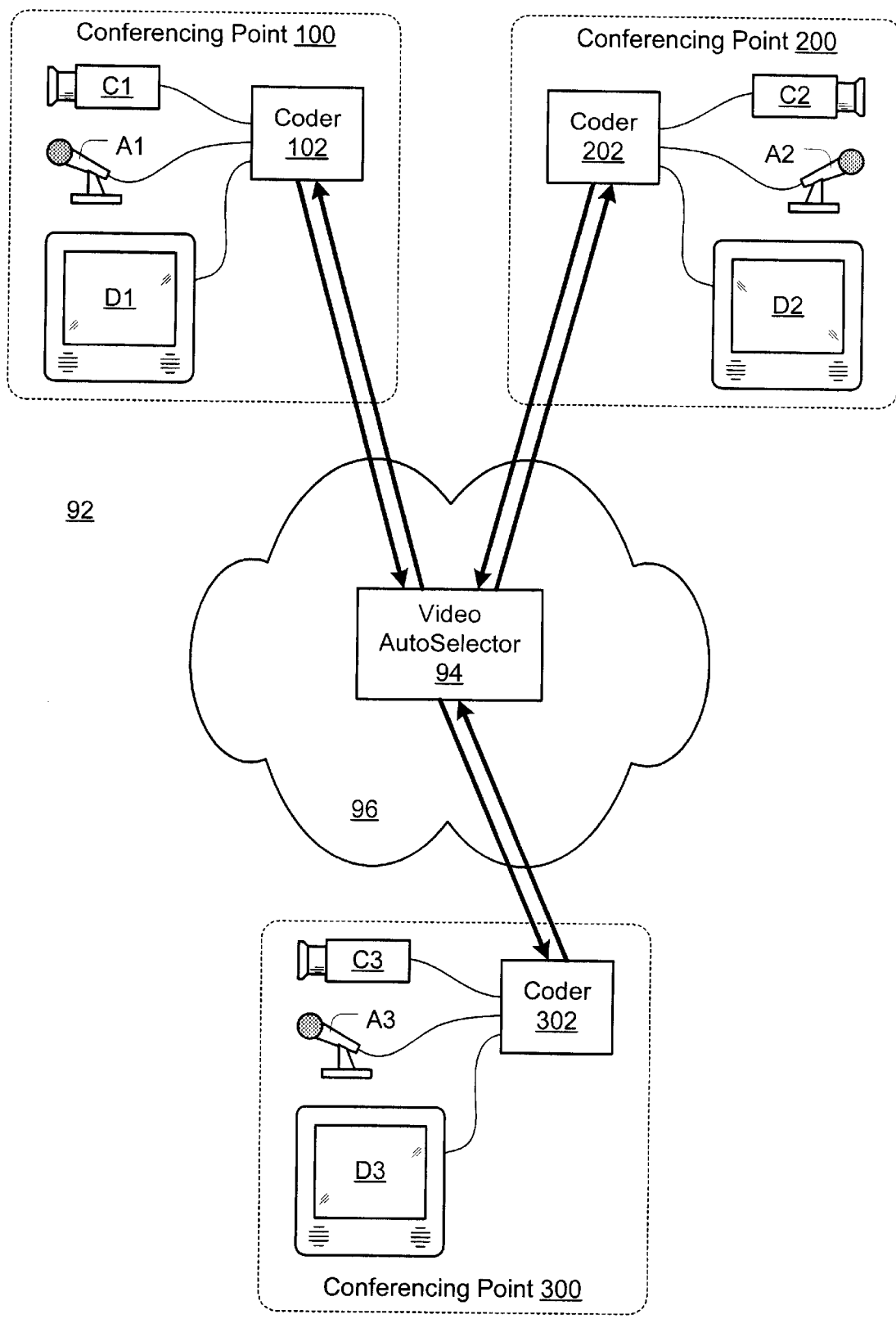
FIG. 7 show a networked video conferencing configuration using a video autoselector according to an embodiment of the invention.

FIG. 7 shows three "conferencing points" 100, 200, and 300. These points can illustrate a three-way videoconference, but are also appropriate for other applications such as security, gaming, electronic classrooms, etc. Each conferencing point contains at least one camera (e.g., C1), audio sensor (e.g., A1), and display (e.g., D1), all connected to a coder (e.g., 102). Each of coders 102, 202, 302, communicates across network 96 with video autoselector 94.

In one method of operation, coder 100 encodes video from C1 and audio from A1, and transmits the encoded video and audio streams to video autoselector 94. Coders 202 and 302 do likewise with their video and audio streams. Each coder can operate according to known video and/or audio coding/compression/packetization algorithms. Video autoselector 94 can then use the audio streams (and selection time-history) to select which video stream to supply to each conferencing point. This function can operate much like the single-room examples above, except that each conferencing point may at any given time receive a different video source than the other conferencing points are receiving. Inside autoselector 94, a separate instance of the switching logic can match with each endpoint, each instance keeping a selection time-history for that endpoint. The switched video streams arrive at their destination endpoints, where the respective coders decode them and display them on the attached displays. Audio can be mixed or switched by autoselector 94, or each endpoint can receive the audio stream from each other endpoint.

Operation can be enhanced in several ways. When the autoselector does no actual processing of video streams, there may be no need for the video streams to pass through the autoselector. Instead, autoselector 94 can signal the endpoints as to when (and to which other endpoints) to supply an output video stream, and the video streams can pass directly from endpoint to endpoint through network 96, using either unicast or multicast transmission. One advantage of this enhancement is that it decreases bandwidth for unselected video sources. Autoselector 94 may also provide bridging or translation functions as needed, and can serve as a common connection point for the conference.

The general illustration of FIG. 7 can be modified in many ways. The autoselector may be physically located at one of the endpoints. Some endpoints may be audio-only, or receive-only. An endpoint may also have multiple audio and/or video sensors—in this case, the endpoint's coder could encode multiple streams, or an additional autoselector (such as the single-room examples above) could be used to select one output stream for that endpoint.

The described embodiments are particularly suited for implementation in a programmable digital processing system, e.g., a specialized digital signal processor dedicated to the autoselection task, or a general-purpose computer programmed to perform the autoselection task. For instance, in a general-purpose computer, the audio inputs can be supplied to one or more sound cards connected to the computer. The sound cards digitize the audio signals, and supply the digitized audio signals to the computer's central processing unit and attached memory. The computer is configured to run a software process that retrieves the digitized audio signals, calculates audio scores, and makes periodic video switching decisions according to the preceding description (alternately, the audio scoring or part of the audio scoring can be done on the sound card). The software process produces a video switching signal, e.g., to a separate process or device that performs video switching, to a video card, or as a networked signal to another computer.

In accordance with a programmed computer embodiment, in one aspect the invention includes an apparatus comprising a computer-readable medium containing computer instructions that, when executed, cause one or more processors to operate according to a method of autoselecting a video source. For instance, in the computer example above, the software process can be stored on magnetic or optical media, in a semiconductor memory, or at a remote location accessible over a network.

Although specific computational methods have been included for audio scoring and video source selection, these are merely exemplary. Those of ordinary skill in the art will recognize upon reading this disclosure that many, many alternatives can be devised to provide similar functionality to the disclosed embodiments. For instance, instead of down-weighting a current video source, unselected sources can be up-weighted the longer they remain unselected. The minimum segment length may be different for a temporary segment than a regular segment, and/or a different weighting function could be used. Other rules can also be mixed in, such as rules that a certain source must be selected at least once every T seconds. Different rules can also be devised for more complex scenarios, such as different weighting functions or examination intervals for exchanges involving one primary speaker than for exchanges involving multiple primary speakers, each speaking shortly.

Audio scoring can also vary greatly from system to system. The disclosed method of scoring tends to work well at rejecting loud, transient noises such as a dropped object or a cough, but more sophisticated scoring methods could be employed as well, including speech recognition and speaker recognition. The input to audio scoring could also be simplified—instead of the autoselector receiving an analog or pulse-code-modulated audio stream, it could receive something else. That something else could be a periodic voice-activity detection (VAD) signal from an endpoint that is performing its own voice activity detection. The something else could also be, e.g., a subband-coded audio signal. In this latter case, the audio scorer may examine the energy distribution in the subbands to perform scoring, without having to re-create a PCM stream in order to score the audio.

One of ordinary skill in the art will recognize that the concepts taught herein can be tailored to a particular application in many other advantageous ways. In particular, those skilled in the art will recognize that the illustrated embodiments are but one of many alternative implementations that will become apparent upon reading this disclosure. An audio stream can be embedded in a video stream. The audio scorer, as well as some other elements of an embodiment, need not be digital. A video stream need not be associated with a traditional analog video camera, e.g., the stream could be a video camera digital output signal, a digitally-compressed video signal, a recorded video signal, a computer-generated video signal, etc. Such minor modifications are encompassed within the invention, and are intended to fall within the scope of the claims.

The preceding embodiments are exemplary. Although the specification may refer to "an", "one", "another", or "some" embodiment(s) in several locations, this does not necessarily mean that each such reference is to the same embodiment(s), or that the feature only applies to a single embodiment.

What is claimed is:

1. An automatic video switching system comprising:
   multiple audio inputs, each associated with at least one corresponding video source;
   an audio scorer capable of calculating an audio score for each of the audio inputs, the audio score for a given audio input corresponding to an audio signal received at that input over an examination interval;
   state memory to store at least a partial time-history of video source selection; and
   switching logic to select a current video source for a given examination interval, based on a weighted comparison for that examination interval of the audio scores associated with each of the video sources, the comparison weighting based on the partial time-history of video source selection.

2. The system of claim 1, wherein the switching logic comprises a set of conversational rules that increase the probability of switching between video sources as one source remains selected for multiple consecutive examination intervals.

3. The system of claim 1, wherein the switching logic also bases selection of a current video source on one or more features extracted from one or more of the video sources.

4. The system of claim 1, wherein the system has the capability to operate in a real-time mode wherein the switching logic selects a current video source at a point in a video stream corresponding approximately to the end of the given examination interval.

5. The system of claim 1, wherein the system has the capability to operate in a posterior composition mode wherein the switching logic selects a current video source at a given temporal video switching point based on an examination interval that includes audio input that corresponds to a point in a video stream that occurs after the video switching point.

6. The system of claim 1, further comprising a video switcher to accept video signals from the video sources corresponding to the audio inputs, and to switch one of those video sources onto a video output in response to the current video source selection of the switching logic.

7. The system of claim 1, wherein each video source is selected from the group of sources comprising:
   an analog video camera output signal,
   a video camera digital output signal,
   a digitally-compressed video signal,
   a recorded video signal, and
   a computer-generated video signal.

8. The system of claim 1, wherein the system comprises at least one network connection to receive one of the audio inputs from a remote location.

9. The system of claim 1, wherein the switching logic has the capability to select a different current video source for each of several remote locations.

10. A method of automatically selecting a video source from among multiple available video sources, the method comprising:
    associating at least one audio source with each of the video sources;
    evaluating, over an examination interval, an audio signal received from each audio source, thereby forming an audio score for each audio source that expresses the level of audio activity present at that audio source during the examination interval;
    maintaining at least a partial time-history of video source selection;
    performing a weighted comparison for the evaluation interval of the audio scores associated with each of the video sources, where the weighting is based on the partial time-history of video source selection; and
    selecting a current video source based on the weighted comparison.

11. The method of claim 10, wherein when more than one audio score is associated with a given video source, selecting the largest of the audio scores associated with that video source as the score for weighted comparison for that evaluation interval.

12. The method of claim 10, wherein when more than one audio score is associated with a given video source, combining the audio scores associated with that video source by calculating a norm of those audio scores.

13. The method of claim 10, wherein associating at least one audio source with each of the video sources comprises expressing the association as a matrix that indicates a weight for each combination of audio source and video source, and wherein performing a weighted comparison comprises, for each video source, producing a combined score by weighting the audio scores by the corresponding weights in the matrix.

14. The method of claim 10, wherein performing a weighted comparison comprises weighting the audio score associated with a last-selected current video source according to a weighting function that varies according to the length of time that the last-selected current video source has remained selected.

15. The method of claim 14, wherein when the last-selected video source remains selected for an extended period of time, further weighting the audio score associated with that source by a fractional weight to decrease the probability of that source remaining selected.

16. The method of claim 10, wherein forming an audio score comprises dividing the examination interval into a number of temporal subwindows, and for each subwindow:
    determining the variation in each of the audio signals during that subwindow; and incrementing the audio score for the audio source having the largest variation for that subwindow.

17. The method of claim 10, the method further comprising, when one of the audio sources and a corresponding video source are at a location remote from the location where the current video source is selected, receiving the audio signal over a communications network, and notifying the remote location to transmit video when its video source has been selected as the current video source.

18. The method of claim 10, wherein the selection of a current video source occurs in real-time at approximately the end of an examination interval.

19. The method of claim 10, comprising relating the selection of a current video source to a point in the video stream that corresponds to a time preceding the end of the examination interval.

20. An apparatus comprising a computer-readable medium containing computer instructions that, when executed, cause a processor or multiple communicating processors to perform a method of automatically selecting a video source from among multiple available video sources, the method comprising:

associating at least one audio source with each of the video sources;

evaluating, over an examination interval, an audio signal received from each audio source, thereby forming an audio score for each audio source that expresses the level of audio activity present at that audio source during the examination interval;

maintaining at least a partial time-history of video source selection;

performing a weighted comparison for the evaluation interval of the audio scores associated with each of the video sources, where the weighting is based on the partial time-history of video source selection; and selecting a current video source based on the weighted comparison.

21. The apparatus of claim 20, wherein associating at least one audio source with each of the video sources comprises expressing the association as a matrix that indicates a weight for each combination of audio source and video source, and wherein performing a weighted comparison comprises, for each video source, producing a combined score by weighting the audio scores by the corresponding weights in the matrix.

22. The apparatus of claim 20, wherein performing a weighted comparison comprises weighting the audio score associated with a last-selected current video source according to a weighting function that varies according to the length of time that the last-selected current video source has remained selected.

23. The apparatus of claim 20, wherein forming an audio score comprises dividing the examination interval into a number of temporal subwindows, and for each subwindow:

determining the variation in each of the audio signals during that subwindow; and incrementing the audio score for the audio source having the largest variation for that subwindow.

24. The apparatus of claim 20, the method further comprising, when one of the audio sources and a corresponding video source are at a location remote from the location where the current video source is selected, receiving that audio signal over a communications network, and notifying the remote location to transmit video when its video source has been selected as the current video source.

* * * * *